(12) United States Patent
Yamakawa

(10) Patent No.: US 6,999,680 B2
(45) Date of Patent: Feb. 14, 2006

(54) WDM TRANSMISSION SYSTEM, CENTRAL CONTROLLER FOR THE SYSTEM, AND METHOD FOR CONTROLLING PREEMPHASIS IN THE SYSTEM

(75) Inventor: Shinya Yamakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 661 days.

(21) Appl. No.: 10/087,806

(22) Filed: Mar. 5, 2002

(65) Prior Publication Data
US 2003/0081282 A1 May 1, 2003

(30) Foreign Application Priority Data
Oct. 30, 2001 (JP) .............................. 2001-333371

(51) Int. Cl.
*H04B 10/08* (2006.01)
*H04B 17/00* (2006.01)
*H04J 14/02* (2006.01)
*H04J 14/00* (2006.01)

(52) U.S. Cl. ............................. 398/34; 398/25; 398/79; 398/70; 398/43; 398/66; 398/7

(58) Field of Classification Search ............... 398/49, 398/57, 58, 62, 66, 70, 75, 34, 25, 79, 43, 398/38, 177, 7, 56
See application file for complete search history.

(56) References Cited

U.S. PATENT DOCUMENTS

| | | | |
|---|---|---|---|
| 5,956,165 A * | 9/1999 | Fee et al. | 398/78 |
| 6,359,729 B1 * | 3/2002 | Amoruso | 359/341.1 |
| 6,456,409 B1 * | 9/2002 | Zhou et al. | 398/79 |
| 2003/0215231 A1 * | 11/2003 | Weston-Dawkes et al. | 398/19 |

* cited by examiner

Primary Examiner—Jason Chan
Assistant Examiner—Quan-Zhen Wang
(74) Attorney, Agent, or Firm—Staas & Halsey LLP

(57) ABSTRACT

A WDM transmission system including a plurality of WDM optical network and a central controller communicably connected to the plural WDM optical network via a plurality of monitor/control lines respectively, the central controller includes variation factor monitoring means for monitoring one or more variation factors of preemphasis on each WDM optical network and preemphasis controlling means for controlling a status of the preemphasis by adjusting the setting for the preemphasis performed on each WDM network via respective one of monitor/control lines. Therefore, preemphasis performed each of the plural WDM optical network can be automatically executed without boosting costs and loads on elements of each WDM optical network. Stabilized transmission of a WDM signal can be performed in each of the plural WDM optical network with ease without manual setting.

19 Claims, 4 Drawing Sheets

WDM TRANSMISSION SYSTEM, CENTRAL CONTROLLER FOR THE SYSTEM, AND METHOD FOR CONTROLLING PREEMPHASIS IN THE SYSTEM

BACKGROUND OF THE INVENTION

1. Field of the Invention

The present invention relates to a WDM (Wavelength Division Multiplexed) transmission system, a central controller for the system, and a method for controlling preemphasis in the system.

2. Description of the Related Art

Recently, an increased number of WDM transmission apparatuses are being installed within networks for service providers in response to drastic growth in requirements for communication lines, such as the Internet. As a result of the spread of WDM transmission apparatuses, there are demands for proper methods to simplify the optimization and the management of the apparatuses.

In a WDM transmission system, an optical transmitter transmits a WDM signal, into which a plurality of optical signals at respective different wavelengths are multiplexed, is transmitted to an optical receiver via one or more optical repeaters (optical amplifiers), which relay the WDM signal, arranged on the optical transmission line. Individual optical signals in the WDM signal may be at different intensities when received by the optical receiver because of the character of the optical transmission lines and a gain-wavelength dependence of each of the optical repeaters (i.e., an occurrence of a tilt) whereupon qualities (OSNR: Optical Signal to Noise Rate) of the optical signals as received at the optical receiver may be not equal.

In order to eliminate the possibility of an occurrence of a tilt, a technique of "preemphasis," in which optical signals to be transmitted from an optical terminal have respective sufficient intensities that are previously set in such a manner that an optical receiver receives optical signals identical in intensity, is known to the art. An optimization of a WDM signal by a preemphasis technique requires, upon installation of a WDM transmission apparatus and/or prior to starting its operation, manual setting and changing of intensities of optical signals in the WDM signal, by which intensities an optical transmitter transmits the optical signals, based on the result of a measurement of intensities (a received OSNR) of optical signals received by an optical receiver.

However, this conventional preemphasis tends to fail in flexibility to respond to a change in one or more variation factors that causes a new setting for preemphasis (e.g., amounts of preemphasis) due to factors, such as, deterioration of the apparatus over time, change in the number of wavelengths used for optical signals (multiplexed into a WDM signal), or an error arising in a WDM transmission system.

For this reason, it is preferably suggested that at least one WDM apparatus on an optical transmission line in a WDM transmission network functions to monitor and control the above-mentioned variation factors at all times so as to autonomously respond to change in the variation factors. Nevertheless, such a WDM network is expensive and requires a large load to operate.

SUMMARY OF THE INVENTION

With the foregoing problems in view, there is an object of the present invention to realize automated setting for preemphases carried out on each of a plurality of WDM networks without boosting costs for and loads on apparatuses in the WDM networks so that the WDM networks do not require manual setting for the preemphases and carry out stablilized transmission of the plural WDM signals with ease.

To attain the object, there is provided a WDM transmission system, comprising: a plurality of WDM optical networks, each of the WDM optical network including an optical signal receiver, and an optical signal transmitter, communicably connected to the optical signal receiver, for transmitting, to the optical signal receiver, a WDM signal having a plurality of optical signals at respective different wavelengths with adjusting each of intensities of the plural optical signals by performing preemphasis; and a central controller, communicably connected to the plural WDM optical networks via a plurality of monitor/control lines respectively, including: variation factor monitoring means for monitoring one or more variation factors which requires a new setting for the preemphasis performed by the optical signal transmitter of each the WDM optical network via a respective one of the plural monitor/control lines; andpreemphasis controlling means for controlling controlling a status of the preemphasis by adjusting the setting for the preemphasis performed by the optical signal transmitter of each the WDM optical network via the respective monitor/control line based on the result of the monitoring carried out by the variation factor monitoring means.

Since the central controller monitors the variation factors for preemphasis performed by the optical signal transmitter of each the WDM optical network and adjusts the setting for the preemphasis of each WDM optical network via the respective monitor/control line based of the result of the monitoring, setting of the preemphasis performed by optical transmitter of each of the plural WDM optical network is automatically executed thereby requiring no manual operation.

As a preferable feature, the central controller further may include storing means for storing intensity information of intensities of the optical signals at the respective different wavelengths, which optical signals are included in the WDM signal output from the optical signal transmitter of each the WDM optical network when an initialization for amounts of the preemphasis is performed, and time information of the time when the initialization is performed; the variation factor monitoring means may include elapsed-time monitoring means for monitoring, as one of the variation factors, whether or not a predetermined time period has passed since an initialization of a first optical signal transmitter, which is the optical signal transmitter of one of the plural WDM optical networks based on the time information stored in the storing means; and the preemphasis controlling means may include intensity controlling means for controlling, if the result of the monitoring by the elapsed-time monitoring means is positive, intensities of optical signals in a WDM signal that is to be output from the first optical signal transmitter by adjusting amounts of the preemphasis performed by the first optical signal transmitter in such a manner that the last-named intensities of the first optical signal transmitter become identical with those when the initialization is performed, based on the intensity information stored in the storing means.

With this configuration, even if intensities of optical signals in a WDM signal that is to be output from the first optical signal transmitter are changed after the predetermined time period from the initialization, it is possible to automatically adjust amounts of the preemphasis performed by the first optical signal transmitter in such a manner that the last-named intensites of the first optical signal transmitter become identical with those when the initialization is performed.

As another preferable feature, the variation factor monitoring means of the central controller may further include: the-number-of-wavelengths-information collecting means for collecting, as one of the variation factors, the-number-of-wavelengths information about the number of wavelengths used for optical signals of the WDM signal transmitted in the each WDM optical network, and the-number-of-wavelengths monitoring means for monitoring whether or not there is a change in the number of wavelengths used for optical signals of the WDM signal transmitted in a first WDM optical network, which is the WDM optical network one of the plural WDM optical networks, based on the the-number-of-wavelengths information, which has been collected by the the-number-of-wavelengths collecting means; and the preemphasis controlling means of the central controller may include: amount-of-preemphasis computing means for computing, if the result of the last-named monitoring by the the-number-of-wavelengths monitoring means is positive, amounts of preemphasis that is to be performed on the plurality optical signals of the WDM signal in the first optical network in accordance with the change in the number of wavelengths, which change is monitored as the the-number-of-wavelengths information by the wavelength monitoring means, and amount-of-preemphasis controlling means for controlling an optical signal transmitter the first WDM optical network in such a manner that the first particular WDM optical network performs preemphasis of the last-named amounts, which has been computed by the amount-of-preemphasis computing means.

With this configuration, even if the number of wavelengths used for the optical signal (the number of optical signals multiplexed into the WDM signal) of each WDM optical network changes, it is possible to adjust amounts of preemphasis to be performed on the optical transmitter in each WDM optical network in accordance with the change in the number of wavelengths.

As mentioned above, the central controller monitors the variation factors (e.g., deterioration over time of an optical transmission line or a light source, change in status of an operation (increase/decrease of wavelengths used for optical signals), an error) which require a new setting for the preemphasis performed by the optical signal transmitter by each WDM optical network and adjusts a setting of the preemphasis of each optical network via the respective monitor/control line based on the monitoring, it is possible to automatically and centrally re-set preemphasis to a desired (optimum) mode if necessary.

As a result, it is possible to (i) eliminate a manual operation to decide a setting for preemphasis to be performed on each WDM network, and to simplify installation and maintenance for elements of each WDM network thereby reducing costs for maintenance. Further, it is possible to (ii) minimize the function required for each WDM network to respond to the variation factors without boosting loads on elements of each WDM network. Therefore stabilized transmission of the plural WDM signals can be carried out with ease.

Further, since it is possible to adjust a setting for preemphasis with respect to a WDM signal transmitted in each WDM optical network on the basis of quality information of the WDM signal, transmission capacities of each WDM optical can be kept in a more desirable condition as compared with the case where amounts of preemphasis are set to fixed values.

Other objects and further features of the present invention will be apparent from the following detailed description when read in conjunction with the accompanying drawings.

DESCRIPTION OF THE PREFERRED EMBODIMENTS

A preferred embodiment of the present invention will now be described with reference to the accompanying drawings.

Figure 1:
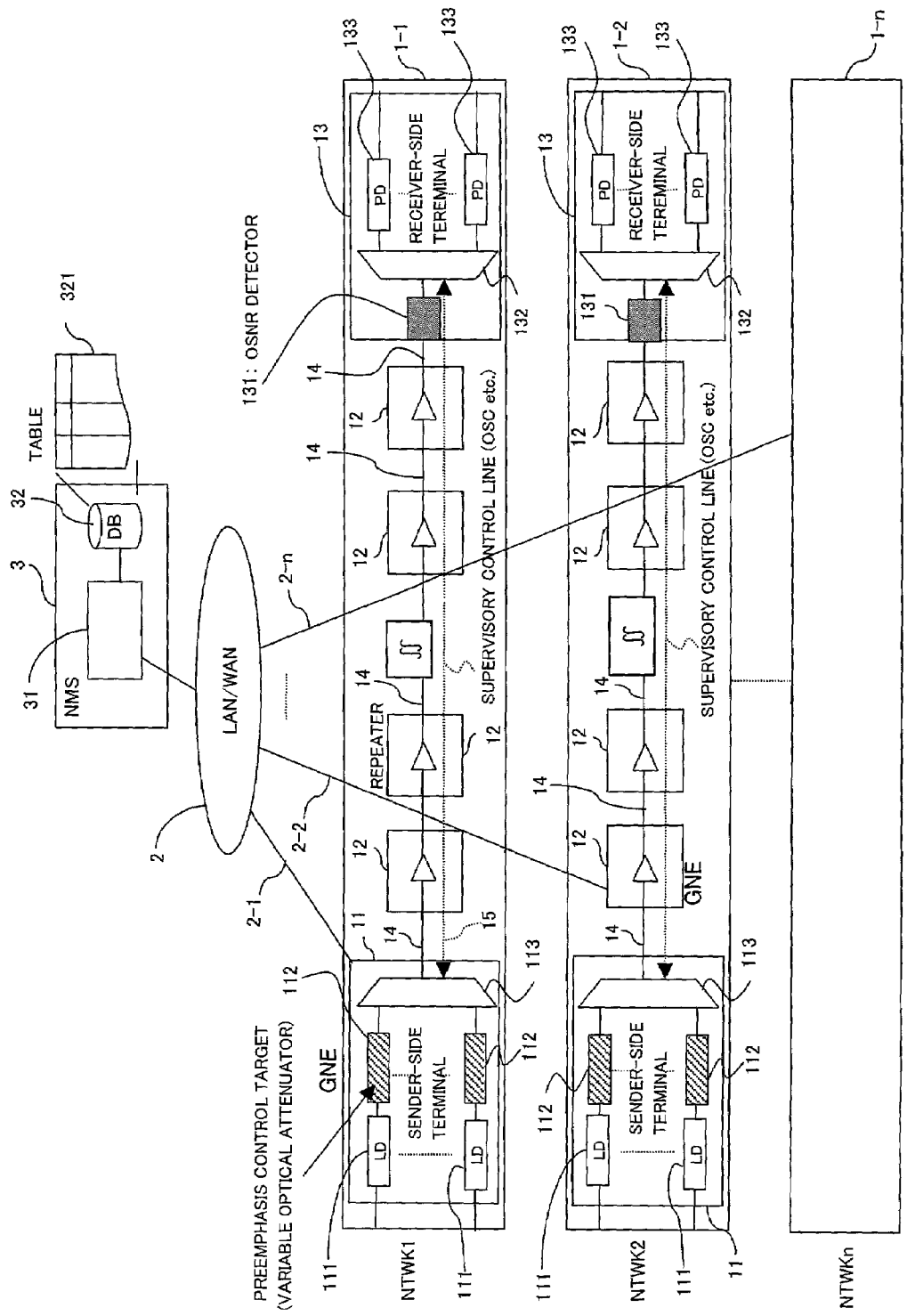
FIG. 1 is a block diagram schematically showing a WDM (Wavelength Division Multiplexed) transmission system according to a first embodiment of the present invention.

(A) First Embodiment:

FIG. 1 shows a WDM (Wavelength Division Multiplexed) transmission system according to a first embodiment of the present invention. The WDM transmission system comprises a plurality of WDM networks 1—1 through 1-*n* (n is an integer larger than one), and an NMS (Network Management System) server 3, serving as a central controller, which is communicably connected to each WDM network 1-*i* (where, i is an integer of one through n) via a network 2. Network 2 is exemplified by a LAN (Local Area Network) or a WAN (Wide Area Network) having monitor/control lines 2-1 through 2-*n*, respectively dedicated to each of WDM networks 1—1 through 1-*n*. The network 2 performs communication between each of WDM networks 1—1 through 1-*n* and NMS server 3 via a communication protocol, such as TCP (Transmission Control Protocol)/IP (Internet Protocol) or X.25.

Each WDM network 1-*i* comprises WDM terminals 11 and 13 that receive and transmit WDM signals, and one or more WDM apparatuses (repeaters/light-amplifiers) 12 (hereinafter simply called "repeater nodes 12"), each of which regenerates and amplifies the WDM signals transmitted between the WDM terminals 11 and 13. The number of repeater nodes 12 in each WDM network is decided in accordance with the distance between WDM terminals 11 and 13 in the WDM network 1-*i* in question.

FIG. 1 illustrates WDM terminal 11 serving as an optical transmitter and WDM terminal 13 serving as an optical receiver for convenience, whereupon elements of WDM terminal 11 for an optical receiver and of WDM terminal 13 for an optical transmitter are omitted in the drawing. For this reason, WDM terminals 11, 13 are hereinafter called a sending node 11 that sends WDM signals and a receiving node that receives WDM signals, respectively.

As shown in FIG. 1, at least one of sending node 11, repeater nodes 12, and receiving node 13 in WDM network 1-*i* is communicably connected to NMS server 3 via monitor/control line 2-*i*. The node connected to NMS server 3 is called a GNE (gateway Node Equipment) because of its function.

For example, sending node 11 of WDM network 1—1 is connected to NMS server 3 via monitor/control line 2-1, and one of repeater nodes 12 of WDM network 1-2 is connected via monitor/control line 2—2. A GNE, which is directly connected to NMS server 3 over a communication network (WDM network), integrates supervisory control information of other nodes in an identical communication network, communicates with NMS server 3 via a communication protocol, such as TCP/IP, OSI (Open Systems Interconnection), and at the same time sends each node (NE) in the network supervisory control information from NMS server 3.

Sending node (optical signal transmitter) 11 comprises, as the main parts, a plurality (the number is identical with the number of optical signals to be multiplexed) of light sources 111 (e.g., laser diodes (LDs)) for generating optical signals (channel signals) at respective difference wavelengths to be multiplexed into a WDM signal, a plurality of variable light attenuators (VATT) 112, each dedicated to each of the optical signals to be multiplexed, for adjusting attenuated amounts of intensities of individual optical signals generated by LDs 111, and a wavelength multiplexer (WDM coupler) 113 that multiplexes the optical signal at respective different wavelengths into a WDM signal, optical signals of which output intensities are adjusted by each of variable light attenuators 112. Preemphasis on WDM signals to be sent out to an optical transmission line 14 is performed by variable light attenuators 112 adjusting attenuated amounts of individual optical signals. Optical transmission line 14 generally takes the form of an optical fiber, such as SMF (Single Mode Fiber) and DSF (Dispersion Shifted Fiber).

On the other hand, the main parts of receiving node 13 are an OSNR (Optical Signal to Noise Rate) detector 131 that detects OSNR of optical signals at respective different wavelengths, which signal is multiplexed into a WDM signal received from optical transmission line 14, a wavelength demultiplexer (WDM coupler) 132 that demultiplexes a WDM signal to optical signals at respective different wavelengths from the received WDM signal, and photodiodes (PDs) 133 of the number of optical signals multiplexed into the WDM signal, which PDs respectively receive the optical signals demultiplexed in wavelength demultiplexer 132 and then converts the optical signals to electrical signals.

For example, OSNR detector 131 is an optical spectrum analyzer. Sending node 11 includes, as a signal-receiving system, OSNR detector 131, WDM coupler 132, and PDs 133, which are identical to those included in receiving node 13, but do not appear in FIG. 1. Receiving node 13 includes, as a signal-sending system, LDs 111, variable light attenuators 112, and WDM coupler 113, which are identical with those included in sending node 11 and also do not appear in the drawing.

Each repeater node 12 takes the form of an EDFA (Erbium Doped Fiber Amplifier), a Raman amplifier or a hybrid-type amplifier that is a combination of an EDFA and a Raman amplifier. Sending node 11, repeater nodes 12, and receiving node 13 communicate with each other via monitoring/controlling signals (supervisory control line 15; OSC or the like) multiplexed into a WDM signal transmitted on optical transmission line 14.

Figure 2:
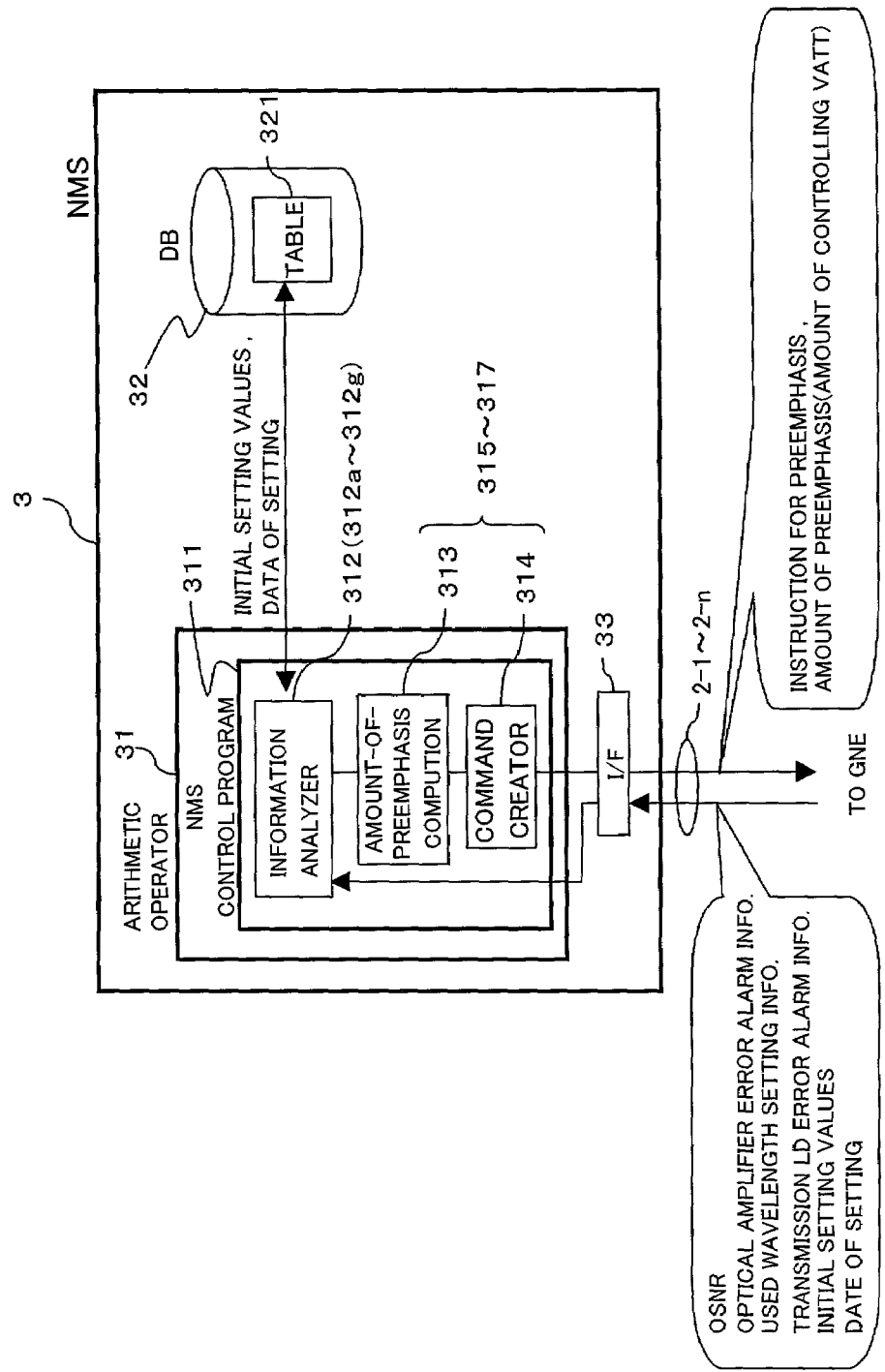
FIG. 2 is a detailed functional block diagram schematically showing an NMS (Network Management System) server of FIG. 1.

Conversely, NMS server 3 comprises an arithmetic processor 31, a storage (database) 32, and interface (I/F) 33, as shown in FIGS. 1 and 2.

Arithmetic processor 31 serves as an information analyzer 312, an amount-of-preemphasis computing section 313, and a command generator 314 by executing NMS control program (monitor/control program) 311 thereby. Information analyzer 312 analyzes information (e.g., a received OSNR, an optical amplifier alarm information, used wavelength setting information, a transmission LD error alarm, intensities of optical signals output from variable light attenuators 112 when initialization for preemphasis, and the time of the initialization) received from GNE of each WDM network 1-$i$ via monitor/control line 2-$i$, and carries out various processes in accordance with the analyzed information.

Figure 3:
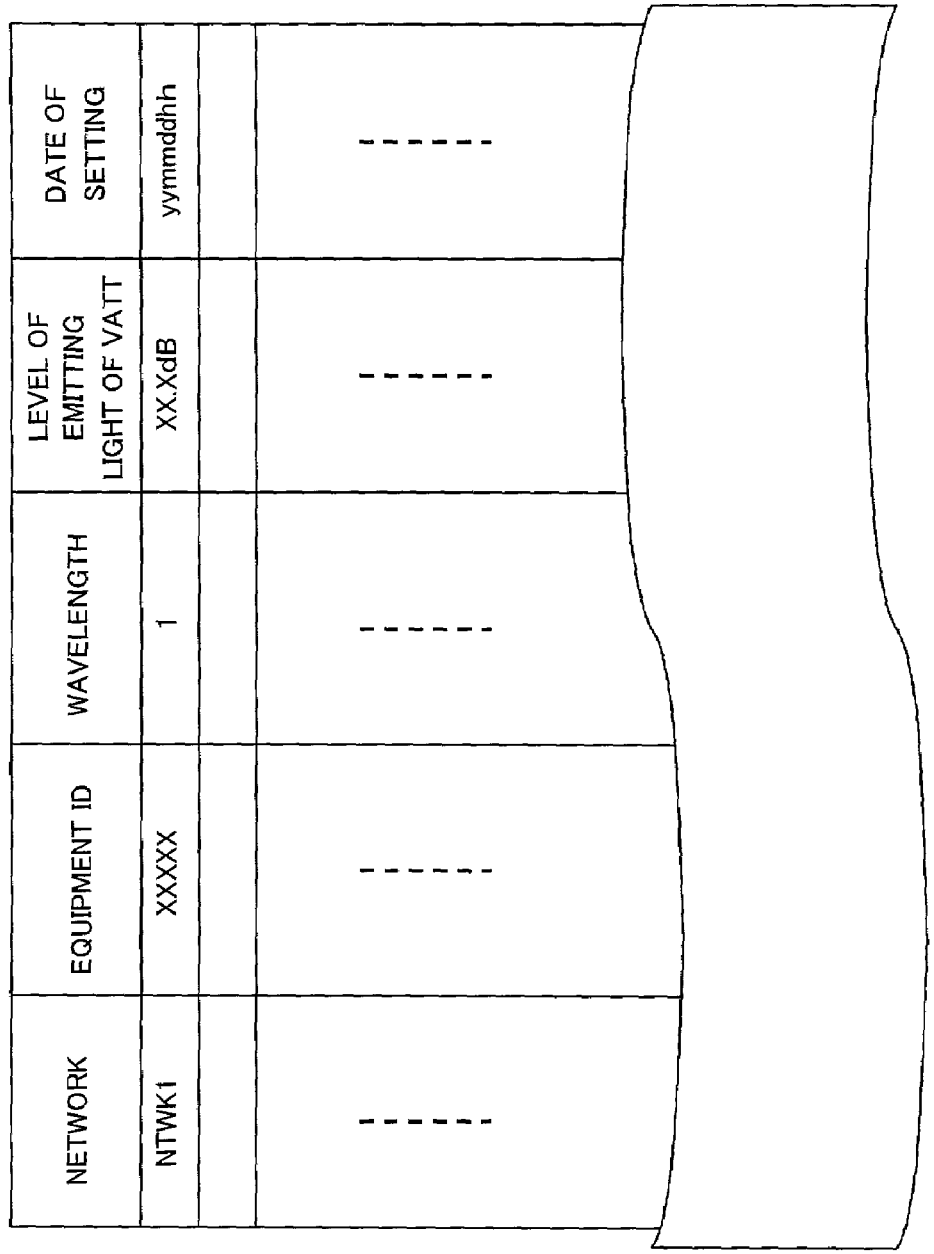
FIG. 3 is an example showing a preemphasis management table managed by the NMS server of FIGS. 1 and 2.

When information analyzer 312 receives, via monitor/control line 2-$i$, information about intensities of optical signals output from sending node 11 (intensities of optical signal output from variable light attenuators 112) as an initialization for preemphasis and information about the time of the initial setting, information analyzer 312 stores these information pieces in a table (a preemphasis management table 321) having the above-mentioned items by each WDM network 1-$i$, in storage 32 as shown in FIG. 3.

Information transmitted from a GNE to NMS server 3 via monitor/control line 2-$i$ has information (such as a network address, or a node address) attached to identify the transmission source of the information (sometimes may be a node other than a GNE) and information about the number of the wavelength. Information analyzer 312 manages an amount of preemphasis of an initial setting and the time when the initialization of the each WDM network 1-$i$ is performed, each node, and each wavelength based on the information for identification and the number of wavelengths, as shown in FIG. 3.

If a transmission source of such information is other than a GNE, the information is at first transmitted to the GNE in an identical WDM network 1-$i$ via supervisory control line 15 whereupon the GNE sends the information to NMS server 3.

Further, information analyzer 312 has functions to (i) periodically monitor whether or not storage 32 has a record that is initialized over a predetermined time (e.g., several months or several years) ago by referring to preemphasis management table 321; (ii) collect received OSNRs (signal quality information), which has been detected by OSNR detector 131, from receiving node 13 of WDM network 1-$i$ at predetermined intervals, or upon receiving alarm information or information about used wavelength issued in accordance with a change in the number of wavelengths used for optical signals; and (iii) monitor whether or not each received OSNR is equal to or smaller than threshold value, one previously set for each WDM network 1-$i$.

Namely, information analyzer 312 serves to function as a variation factor monitoring unit that monitors one or more variation factors causing a new setting for preemphasis, performed by sending node 11 on each WDM network 1-$i$. The variation factor monitoring means carries out functions as follows:

(1) an elapsed-time monitoring section 312$a$ that monitors, as one of the variation factors for preemphasis, whether or not a predetermined time has passed since an initialization of amounts of preemphasis performed by a particular sending node 11 of one of WDM networks 1—1 through 1-$n$ with reference to information of the time when the initialization is performed, which information is stored in storage 32;

(2) an alarm information receiver 312$b$ that receives, as one of the variation factors, alarm information of an alarm issued over a WDM signal transmitted in each WDM network 1-$i$;

(3) a the-number-of-wavelengths-information collector 312$c$ that collects, as one of the variation factors, information about the number of wavelengths used for optical signals transmitted in each WDM network 1-$i$;

(4) the-number-of-wavelengths monitoring section 312$d$ that monitors, as one of the variation factors, whether or not there is a change in the number of wavelengths used for optical signals in a WDM signal transmitted in a particular WDM network 1-$i$, which is one of WDM network 1—1 through 1-$n$ based on the information about the number of wavelengths collected by the-number-of-wavelengths-information collector 312$c$;

(5) a received OSNR (signal quality information) collector 312$e$ that collects, as one of the variation factors, an OSNR (signal quality information) of a WDM signal transmitted in each WDM network 1-$i$, which OSNR is received by receiving node 13, at regular intervals or upon receipt of alarm information at alarm information receiver 312$b$; and (6) a threshold-value memory (threshold-value-information retaining section) 312$f$ that retains a threshold value of a received OSNR for each WDM network 1-$i$; and (7) a signal quality monitoring section 312$g$ that monitors, as one of the variation factors, whether or not a received OSNR of a particular WDM network 1-$i$, which is one of WDM networks 1—1 through 1-$n$, is smaller than the threshold value for the particular WDM network 1-$i$ by comparing the received OSNR collected by received OSNR collector 312$e$ with the threshold value stored in threshold-value memory 312$f$.

Amount-of-preemphasis computing section 313 decides (computes) amounts of preemphasis (intensities of transmission light beams (optical signals) at respective different wavelengths output from variable light attenuators 112) that are to be set for sending node 11 of each WDM network 1-$i$. For example, if the initialization for sending node 11 is carried out a predetermined period of time previously, amount-of-preemphasis computing section 313 decides intensities of transmission light beams at respective different wavelengths output from variable light attenuators 112, which intensities are previously registered in preemphasis management table 321, as (control) information about a setting for preemphasis that is to be performed on the particular sending node 11.

On the other hand, upon receipt of information about the number of wavelengths used for optical signals from sending node 11 (when there is a change (an increase or a decrease) in the number of wavelengths), information analyzer 312 re-computes amounts of preemphasis (intensities of light beams to be output) suitable for the preemphasis performing on the sending node 11 after the change in the number; and when receiving an alarm (a transmission LD error alarm from sending node 11 or an optical amplifier error alarm from optical repeater 12), information analyzer 312 monitors a received OSNR of a WDM signal(hereinafter called "in a received OSNR monitoring mode"), which OSNR is detected by OSNR detector 131, whereupon, if necessary (specifically, the received OSNR is equal to or smaller than the threshold value), amounts of preemphasis to be performed in the sending node 11 is computed again in such a manner that a received OSNR becomes the maximum value.

NMS server 3 ordinarily retains information about the configuration ("apparatus configuration information", including the number of wavelengths used for optical signals, whether each node is a terminal or a repeater, etc.) of each node controlled by NMS server 3 in the form of a database in storage 32, for example. The apparatus configuration information may be of course stored in a memory except storage 32. Information analyzer 312 (the-number-of-wavelengths monitoring section 312$d$) automatically detects a change in the apparatus configuration of each node based on the apparatus configuration information stored and information about the number of wavelengths used for optical signals notified by the-number-of-wavelengths-information collector 312$c$ whereupon amount-of-preemphasis computing section 313 re-computes amounts of preemphasis to be performed in WDM network 1-$i$ in which the number of wavelengths used for optical signals has been changed in accordance with the change.

Namely, when information analyzer 312 (the-number-of-wavelengths monitoring section 312$d$) detects a change in the number of wavelengths used for optical signals in a WDM singal transmitted in WDM network 1-$i$, amount-of-preemphasis computing section 313 computes amounts of preemphasis to be performed on sending node 11 of the WDM network 1-$i$ based on the information about the number of wavelengths used for optical signals in a WDM signal that are to be transmitted after the number of wavelengths has been changed.

The above-mentioned monitoring of a received OSNR (a received OSNR monitoring mode) is also executed when periodically deciding setting for preemphasis based on preemphasis management table 321, or when re-computing amounts of preemphasis in accordance with an increase or a decrease in the number of wavelengths, as well as when receiving alarm information.

In other words, the monitoring of a received OSNR is carried out by being in "a received OSNR monitoring mode" after deciding the setting for preemphasis at regular intervals or due to a change in the number of wavelengths used for optical signals, and amounts of the preemphasis are re-computed and re-set (updates) if necessary (if the received OSNR is equal to or smaller than the threshold value retained in threshold-value memory 312$f$) in the same manner as upon receipt of alarm information.

Command generator 314 generates a preemphasis setting command destined for the sending node 11 in the WDM network 1-$i$. The preemphasis setting command includes amounts (intensities of light beams to be output in the form of optical signals at respective different wavelength) of preemphasis to be performed on the sending node 11 in WDM network 1-$i$, which amounts have been obtained by amount-of-preemphasis computing section 313, an address of the WDM network 1-$i$ as a destination network address, and a node address of the sending node 11 as a destination node address. Upon receipt of the preemphasis setting command at the sending node 11, amounts of light beams at respective different wavelengths attenuated by variable light attenuators 112 of the sending node 11 are automatically adjusted in such a manner that intensities of light beams to be output from the variable light attenuators 112 become the same amounts as the received preemphasis setting command directs. As a result, amounts of preemphasis by the sending node 11 are re-set.

Specifically, in the sending node 11 that has received a preemphasis setting command, monitor PDs 114 (see FIG. 4), each dedicated to each of variable light attenuators 112, monitor light output from each variable light attenuator 112 whereupon an attenuated value of light beams output from each variable light attenuator 112 is adjusted (feed-back-controlled) in such a manner that the intensities of the light beams monitored by monitor PDs 114 become the same intensities as the preemphasis setting command directs.

As mentioned above, the combination of amount-of-preemphasis computing section 313 and command generator 314 of the present invention serves as a preemphasis controlling section that controls status of preemphasis performed by sending nodes of each WDM network 1-$i$ by adjusting a setting for preemphasis that is to be performed in sending node 11 in the WDM network 1-$i$ via monitor/control line 2-$i$ based on the result of monitoring performed by 312 (elapsed-time monitoring section 312$a$, the-number-of-wavelengths monitoring section 312$d$, signal quality monitoring section 312$g$). The preemphasis controlling section has functions as follows:

(1) an intensity controller 315 that controls, if information analyzer 312 (elapsed-time monitoring section 312$a$) judges that a predetermined time period has passed, intensities of optical signals in a WDM signal that is to be output from sending node 11 in WDM network 1-$i$ by adjusting present amounts of preemphasis performed on the sending node 11 via monitor/control line 2-$i$ in such a manner that intensities of optical signals output from the sending node 11 become identical to those in the intialization for the preemphasis on the sending node 11 based on information about intensities of optical signals to be output from the sending node 11, which information is stored in storage 32;

(2) an amount-of-preemphasis controller 316 that controls sending node 11 of WDM network 1-$i$ via monitor/control line 2-$i$ in such a manner that the sending node 11 performs preemphasis of an amount, which has been computed by amount-of-preemphasis computing section 313 in accordance with a change in the number of wavelengths used for optical signals to be sent from the sending node 11; and (3) a quality controller 317 controls intensities of optical signals in a WDM signal transmitted in the WDM network 1-$i$ by adjusting an amount of preemphasis performed by the sending node 11 in the WDM network 1-$i$ via monitor/control line 2-$i$ in such a manner that a received OSNR, as the result of the preemphasis the amount of which is adjusted and which received OSNR is collected by information analyzer 312 (received OSNR collector 312$e$), becomes greater than the threshold value if information analyzer 312 (signal quality monitoring section 312$g$) judges that a received OSNR of WDM network 1-$i$ is equal to or smaller than a threshold value of a received OSNR corresponding to the WDM network 1-$i$ in threshold-value memory 312$f$.

When the node (i.e., a GNE) that receives a preemphasis setting command for the first time in WDM network 1-$i$ is not sending node 11, the preemphasis setting command is sent to the sending node 11 through supervisory control line 15.

I/F 33 sends a preemphasis setting command to sending node 11 of the right destination of the command with reference to a network address and a node address that are added to the command At the same time, I/F 33 transmits information (an OSNR, information about the number of wavelengths used for optical signals, alarm information, or the like) received from WDM network 1-$i$ to information analyzer 312.

Figure 4:
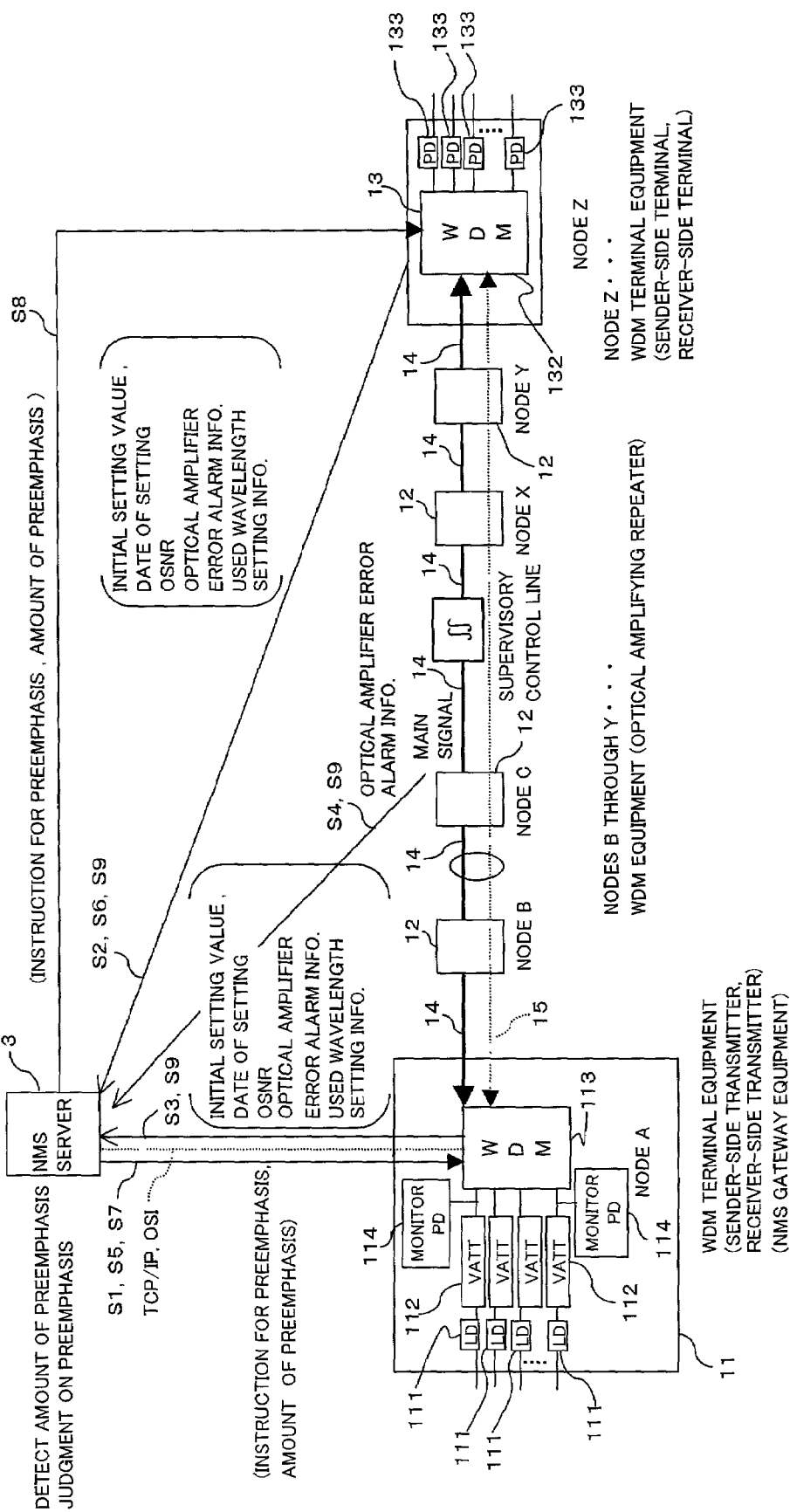
FIG. 4 is a diagram illustrating an operation (controlling preemphasis) performed in the WDM transmission system of FIG. 1.

An operation (a method for control preemphasis) performed in the WDM system of the present invention will now be described with reference to FIG. 4.

First of all, the execution of NMS control program 311 in NMS server 3 causes information analyzer 312 (elapsed-time monitoring section 312$a$) to periodically refer to preemphasis management table 321 in storage 32 in order to monitor whether or not there is a record (WDM network 1-$i$) on which a predetermined period of time (a previously set time period) has passed since the latest setting (the initialization) has been performed.

If there is a WDM network which brings a positive result of monitoring among WDM networks 1-$i$ through 1-$n$, NMS server 3 (NMS control program 311) instructs command generator 314 to generate a preemphasis setting command destined for the sending node 11 in WDM network 1-$i$. At that time, command generator 314 sets at least a destination network address, a destination node address, and amounts of preemphasis to be performed by the sending node 11, which is previously set in preemphasis management table 321 (intensities of light beams at respective different wavelengths to be output from individual variable light attenuators 112), in the generated preemphasis setting command.

The generated preemphasis setting command is transmitted, via monitor/control line 2-$i$, to the sending node 11 that is identified based on the destination network address and the destination node address therein (Arrow S1). Upon receipt of the command, the sending node 11 adjusts amounts of light beams attenuated by individual variable light attenuators 112 in such a manner that intensities of light beams to be output from individual variable light attenuators 112, which intensities are monitored by monitor PDs 114, become identical with those directed by the preemphasis command received from NMS server 3.

As described above, NMS server 3 automatically re-sets preemphasis performed on sending node 11 based on amounts of the preemphasis stored in preemphasis management table 321 if a preemphasis setting for the sending node 11 has not been updated during a predetermined length of time.

As an advantage, since the WDM system of the present invention automatically compensates for a change in amounts of preemphasis for WDM network 1-$i$ due to a deterioration of intensities of light output from sending node 11 and a change in amounts of attenuated light beams over time without installing equipment to monitor and control preemphasis in each node of individual WDM networks 1-$i$, it is possible to keep transmission capabilities of the individual WDM networks 1-$i$ in desired modes.

After the re-setting, NMS control program 311 collects received OSNRs detected by OSNR detector 131 in receiving node 13 (instructs OSNR detector 131 to notify OSNRs to receiving node 13) at regular intervals (Arrow S2). If the collected OSNR is equal to or smaller than the threshold value, NMS control program 311 computes amounts of preemphasis performed on the sending node 11 again and then adjusts attenuated amounts of variable light attenuators 112 based on a preemphasis setting command in a similar fashion to the above-mentioned manner.

Here, NMS control program 311 registers, in preemphasis management table 321 of storage 32, the intensities of light beams output from variable light attenuators 112, which represents the optimum amount of a preemphasis, and the time when the optimum amount has been set for the preemphasis for the subsequent periodic setting for preemphasis thereby updating the database (the corresponding record).

As a result, even if an OSNR does not become the maximum when preemphasis carried out based on amounts of preemphasis of the initialization originally registered in preemphasis management table 321, setting for the preemphasis and information registered in preemphasis management table 321 are corrected based on a real OSNR of a WDM signal, which OSNR is detected (measured) in receiving node 13.

Therefore, since it is possible for the present invention to carry out preemphasis in accordance with a variation on an OSNR of a WDM signal transmitted in WDM network 1-$i$, transmission capabilities of the individual WDM networks 1-$i$ can be kept in more desirable modes as compared with the case where amounts of a preemphasis performed on each sending node 11 are fixed to an initial setting originally registered in preemphasis management table 321.

The collecting of received OSNRs is carried out at regular intervals. Alternatively, the collection may be carried out when wavelengths used for an optical signal transmitted increase or decrease as well as at regular intervals. Here, it is assumed that LD 111 in sending node 11 in FIG. 4 deteriorates. Generally, sending node 11, repeater nodes 12, and receiving node 13 have functions to monitor states of each LD, such as intensities ("LD-EMT") of a light beam emitted from each LD, an electric current (a bias current; "LD-CRNT") applied to each LD, or a temperature ("LD-TEMP") of each LD. With such a monitoring function, if an error (e.g., an "LD-EMT" error, an "LD-CRNT" error, an "LD-TEMP" error) due to a change over time is detected by a comparison with predetermined threshold values for these items, alarm information is sent to NMS server 3 to notify the occurrence of an error.

When an error in sending node 11 of a GNE is detected, alarm information notifying the error (e.g., an "LD-EMT" error, an "LD-CRNT" error, an "LD-TEMP" error) is sent to NMS server 3 via monitor/control line 2-$i$ (Arrows S3, S4). The address of NMS server 3 is attached as a destination address to the alarm information. When an error is detected in a node other than GNE, alarm information is sent to the GNE via supervisory control line 15 at first and then transmitted to NMS server 3 via monitor/control line 2-$i$.

Upon receipt of the alarm information at NMS server 3, NMS control program 311 (information analyzer 312) in NMS server 3 analyzes the contents of the received alarm information in order to confirm occurrence of an error in LD 111 sending node 11. On the basis of the result of the confirmation, NMS control program 311 causes receiving node 13 to notify a received OSNR detected by OSNR detector 131 and then causes amount-of-preemphasis computing section 313 to compute amounts of preemphasis to be performed on the sending node 11 based on the received OSNR.

After that, NMS control program 311 directs that command generator 314 to generate a preemphasis setting command destined for the sending node 11 that is to be used to adjust intensities of light beams output from variable light attenuators 112 to proper values, which command includes amounts of light beams attenuated by individual variable light attenuators 112 in the sending node 11. The generated preemphasis setting command is sent out to monitor/control line 2-$i$ via I/F 33 (Arrow S5).

Upon receipt of the preemphasis setting command from NMS server 3 via monitor/control transmission line 2-$i$ directly or indirectly through a GNE, the sending node 11 decides settings for a preemphasis that are to be performed thereon by adjusting amounts of light beams attenuated by variable light attenuators 112 in such a manner that intensities of light beams output from the variable light attenuators 112 become identical to those directed in the received command. With this operation performed in the sending node 11, if an error arises at LD 111 in sending node 11, it is possible to keep transmission capabilities for a WDM signal transmitted in the individual WDM networks 1-$i$ in desired modes based on real OSNRs received at receiving node 13.

After of the setting has been decided, NMS server 3 collects an OSNR received at the receiving node 13 (Arrow S6). If the received OSNR is below the desired level (i.e., is equal to or smaller than the predetermined threshold value), NMS server 3 may repeatedly carry out re-computing amounts of preemphasis to be performed by the sending node 11 and re-setting of the preemphasis until a received OSNR reaches a proper level (Arrow S7). After such a latest setting, it is also preferable that NMS control program 311 collects intensities of light beams, each output from each of variable light attenuators 112 in the sending node 11, in accordance with the latest setting thereby updating the contents of storage 32 with the time of the latest setting added thereto.

In the illustrated example, an error arising at LD 111 in sending node 11 triggers the collection of a received OSNR. Alternatively, the collection may be triggered when an error arises because of an excitation light beam (an excitation LD) of a light amplifier in repeater node 12, input/output (a deterioration or a disconnection of a communication line or an optical fiber), and an increase and a decrease in wavelengths used for optical signals (Arrows S4, S9).

NMS server 3 can centrally re-set preemphasis to the best setting for preemphases to be performed on each of WDM networks 1-$i$, in accordance with changes in conditions of lines of individual WDM network 1-$i$ even if an error arises. Therefore it is possible to transmit WDM signals, each having optical signals at respective different wavelengths (channels) of an identical quality, without major changes in the configuration and the scale of sending node 11, repeater nodes 12 and receiving node 13 in WDM network 1-$i$.

Further, the description of this example has been made for settings for preemphasis that is to be performed on sending node 11. As an alternative, setting for preemphasis to be performed on a receiving node 13 can be of course carried out (Arrow S8) in the same manner as this example (Arrow S8).

In the WDM system of the illustrated embodiment, NMS server 3 monitors variation factors (deteriorations of optical transmission line 14 and LD 111) of a setting for a preemphasis over time, a change in operating conditions (an increase and a decrease in wavelengths to be used for optical signals). When NMS server 3 judges, as the result of the monitoring, that the monitored preemphasis requires re-setting, it is possible for NMS server 3 to update (a new setting) the setting for the preemphasis to a desired setting thereby guaranteeing the following advantages:

(1) Since setting for preemphasis performed manually by an operator is not required any longer, it is possible to simplify installation and maintenance of each element in each WDM network, thereby reducing costs for maintenance; and (2) It is possible for each WDM network 1-$i$ to keep WDM signal transmission capabilities with ease by responding to changes in a setting for preemphasis carried out in the network, and, at the same time, to minimize functions of elements of the network without increasing loads on the elements in operation, which results in reduced element costs.

(B) Others:

In the above-mentioned embodiment, re-setting is performed for preemphasis that is to be carried out in WDM terminals 11 and 13, however as an alternative, if repeater node 12 in WDM network 1-$i$ has a function to perform preemphasis, NMS server 3 may also re-set the preemphasis to be performed on the regenerating node 12 to the same manner as re-setting performed for WDM terminals 11 and 13.

In the first embodiment, WDM terminals 11 and 13 are assumed to have a function to automatically adjust (perform a feed-back control) intensities of light beams output from WDM terminals 11 and 13 (variable light attenuators 112 dedicated to optical signals at respective different wavelengths) in accordance with a command that directs the intensities of output light beams, and therefore the command includes information about the intensities of target light beams. When WDM terminals 11 and 13 do not have such a function, NMS server 3 collects the present intensities of light beams in a WDM signal output from each of WDM terminals 11 and 13 (variable light attenuators 112 for individual wavelengths) and then computes amounts of light beams to be attenuated in variable light attenuators 112 based on the collected intensities. After that, NMS server 3 directly designates the computed intensities of light beams to be attenuated by sending each of WDM terminals 11 and 13 a command including the computed value thereby directly adjusting the computed light beams to be attenuated by variable light attenuators 112.

Further, in the first embodiment, adjusting amounts of light beams attenuated by individual variable light attenuators 112 controls amounts of a preemphasis (i.e., intensities of light beams at respective different wavelengths output in a WDM signal from WDM terminals 11 and 13). Alternatively, such amounts of preemphasis may be controlled by directly adjusting intensities of light beams output from individual LDs 111.

The above-mentioned re-setting may be performed at regular intervals, upon receipt of alarm information, when the number of wavelengths used for optical signals changes, or when the result of a received OSNR mode requires. Alternatively, the re-setting may be of course carried out for any arbitrary combination of the foregoing cases.

Further, a received OSNR is detected as quality information. As an alternative, quality information may be obtained by detecting a BER (Bit Error Rate) of a WDM signal received at a receiving node of a WDM network. The alternative can provide the purpose and the result of the present invention.

Further, the present invention should by no means be limited to this foregoing embodiment, and various changes or modifications may be suggested without departing from the gist of the invention.

What is claimed is:
1. A WDM transmission system comprising:
a plurality of WDM optical networks, each of said WDM optical network including
an optical signal receiver, and
an optical signal transmitter, communicably connected to said optical signal receiver, for transmitting, to said optical signal receiver, a WDM signal having a plurality of optical signals at respective different wavelengths with adjusting each of intensities of said plural optical signals by performing preemphasis; and
a central controller, communicably connected to said plural WDM optical networks via a plurality of monitor/control lines respectively, including:
variation factor monitoring means for monitoring one or more variation factors which requires a new setting for said preemphasis performed by said optical signal transmitter of each said WDM optical network via a respective one of the plural monitor/control lines; and
preemphasis controlling means for controlling controlling a status of said preemphasis by adjusting said setting for said preemphasis performed by said optical signal transmitter of each said WDM optical network via the respective monitor/control line based on the result of the monitoring carried out by said variation factor monitoring means, wherein
said central controller further includes storing means for storing intensity information of intensities of the optical signals at the respective different wavelengths, which optical signals are included in the WDM signal output from said optical signal transmitter of each said WDM optical network when an initialization for amounts of said preemphasis is performed, and time information of the time when said initialization is performed;
said variation factor monitoring means includes elapsed-time monitoring means for monitoring, as one of said variation factors, whether or not a predetermined time period has passed since an initialization of a first optical signal transmitter, which is the optical signal transmitter of one of said plural WDM optical networks based on said time information stored in said storing means; and
said preemphasis controlling means includes intensity controlling means for controlling, if the result of said monitoring by said elapsed-time monitoring means is positive, intensities of optical signals in a WDM signal that is to be output from said first optical signal transmitter by adjusting amounts of said preemphasis performed by said first optical signal transmitter in such a manner that said last-named intensities of said first optical signal transmitter become identical with those when said initialization is performed, based on said intensity information stored in said storing means.

2. A WDM transmission system according to claim 1, wherein
said variation factor monitoring means of said central controller further includes:
the-number-of-wavelengths-information collecting means for collecting, as one of said variation factors, the-number-of-wavelengths information about the number of wavelengths used for optical signals of the WDM signal transmitted in said each WDM optical network, and
the-number-of-wavelengths monitoring means for monitoring whether or not there is a change in the number of wavelengths used for optical signals of the WDM signal transmitted in a first WDM optical network, which is the WDM optical network one of said plural WDM optical networks, based on said the-number-of-wavelengths information, which has been collected by said the-number-of-wavelengths collecting means; and
said preemphasis controlling means of said central controller includes:
amount-of-preemphasis computing means for computing, if the result of said last-named monitoring by said the-number-of-wavelengths monitoring means is positive, amounts of preemphasis that is to be performed on the plurality optical signals of the WDM signal in said first optical network in accordance with the change in the number of wavelengths, which change is monitored as said the-number-of-wavelengths information by said wavelength monitoring means, and
amount-of-preemphasis controlling means for controlling an optical signal transmitter said first WDM optical network in such a manner that said first particular WDM optical network performs preemphasis of the last-named amounts, which has been computed by said amount-of-preemphasis computing means.

3. A WDM transmission system according to claim 2, wherein
said variation factor monitoring means of said central controller includes:
signal-quality-information collecting means for collecting, as one of said variation factors, signal quality information about a quality of WDM signal, which is transmitted in said each WDM optical network, at the time when being received by said individual optical receiver therein,
threshold-value-information retaining means for retaining threshold value information of threshold values of qualities of said WDM signal transmitted in said each WDM optical networks, and
signal-quality monitoring means for monitoring whether or not said signal quality information for a second WDM optical network, which is the WDM optical network one of said plural WDM optical networks, is equal to or smaller than said threshold value for said particular WDM optical network, which information is retained in said threshold-value-information retaining means; and
said preemphasis controlling means of said central controller includes quality controlling means for controlling, if the result of last-named monitoring by said signal-quality monitoring means is positive, the intensities of optical signals in a WDM signal that is to be transmitted in said second WDM optical network by adjusting amounts of preemphasis that is to be performed on said second WDM optical network in such a manner that signal quality information of the last-named WDM signal transmitted in said second WDM optical network becomes greater than said last-named threshold value.

4. A WDM transmission system according to claim 3, wherein said signal-quality-information collecting means periodically collects said signal quality information.

5. A WDM transmission system according to claim 4, wherein
said variation factor monitoring means of said central controller further includes alarm-information receiving means for receiving, as one of said variation factors, alarm information of an alarm issued over the WDM signal transmitted in each said WDM optical network; and
said signal-quality-information collecting means starts, upon receipt of said alarm by said alarm receiving means, the collecting of said signal quality information of the WDM signal transmitted in each said optical network, which issued said received alarm information.

6. A WDM transmission system according to claim 3, wherein
said variation factor monitoring means of said central controller further includes alarm-information receiving means for receiving, as one of said variation factors, alarm information of an alarm issued over the WDM signal transmitted in each said WDM optical network; and
said signal-quality-information collecting means starts, upon receipt of said alarm by said alarm receiving means, the collecting of said signal quality information of the WDM signal transmitted in each said optical network, which issued said received alarm information.

7. A WDM transmission system according to claim 1, wherein
said variation factor monitoring means of said central controller includes:
signal-quality-information collecting means for collecting, as one of said variation factors, signal quality information about a quality of WDM signal, which is transmitted in said each WDM optical network, at the time when being received by said individual optical receiver therein,
threshold-value-information retaining means for retaining threshold value information of threshold values of qualities of said WDM signal transmitted in said each WDM optical networks, and
signal-quality monitoring means for monitoring whether or not said signal quality information for a second WDM optical network, which is the WDM optical network one of said plural WDM optical networks, is equal to or smaller than said threshold value for said particular WDM optical network, which information is retained in said threshold-value-information retaining means; and
said preemphasis controlling means of said central controller includes quality controlling means for controlling, if the result of last-named monitoring by said signal-quality monitoring means is positive, the intensities of optical signals in a WDM signal that is to be transmitted in said second WDM optical network by adjusting amounts of preemphasis that is to be performed on said second WDM optical network in such a manner that signal quality information of the last-named WDM signal transmitted in said second WDM optical network becomes greater than said last-named threshold value.

8. A WDM transmission system according to claim 7, wherein said signal-quality-information collecting means periodically collects said signal quality information.

9. A WDM transmission system according to claim 8, wherein
said variation factor monitoring means of said central controller further includes alarm-information receiving means for receiving, as one of said variation factors, alarm information of an alarm issued over the WDM signal transmitted in each said WDM optical network; and
said signal-quality-information collecting means starts, upon receipt of said alarm by said alarm receiving means, the collecting of said signal quality information of the WDM signal transmitted in each said optical network, which issued said received alarm information.

10. A WDM transmission system according to claim 7, wherein
said variation factor monitoring means of said central controller further includes alarm-information receiving means for receiving, as one of said variation factors, alarm information of an alarm issued over the WDM signal transmitted in each said WDM optical network; and
said signal-quality-information collecting means starts, upon receipt of said alarm by said alarm receiving means, the collecting of said signal quality information of the WDM signal transmitted in each said optical network, which issued said received alarm information.

11. A WDM (Wavelength Division Multiplexed) transmission system comprising:
a plurality of WDM optical networks, each of said WDM optical network including an optical signal receiver, and an optical signal transmitter, communicably connected to said optical signal receiver, for transmitting, to said optical signal receiver, a WDM signal having a plurality of optical signals at respective different wavelengths with adjusting each of intensities of said plural optical signals by performing preemphasis; and a central controller, communicably connected to said plural WDM optical networks via a plurality of monitor/control lines respectively, including:

variation factor monitoring means for monitoring one or more variation factors which requires a new setting for said preemphasis performed by said optical signal transmitter of each said WDM optical network via a respective one of the plural monitor/control lines; and preemphasis controlling means for controlling a status of said preemphasis by adjusting said setting for said preemphasis performed by said optical signal transmitter of each said WDM optical network via the respective monitor/control line based on the result of the monitoring carried out by said variation factor monitoring means, wherein said variation factor monitoring means of said central controller further includes:

the-number-of-wavelengths-information collecting means for collecting, as one of said variation factors, the-number-of-wavelengths information about the number of wavelengths used for optical signals of the WDM signal transmitted in said each WDM optical network, and the-number-of-wavelengths monitoring means for monitoring whether or not there is a change in the number of wavelengths used for optical signals of the WDM signal transmitted in a first WDM optical network, which is the WDM optical network one of said plural WDM optical networks, based on said the-number-of-wavelengths information, which has been collected by said the-number-of-wavelengths collecting means; and said preemphasis controlling means of said central controller includes:

amount-of-preemphasis computing means for computing, if the result of said last-named monitoring by said the-number-of-wavelengths monitoring means is positive, amounts of preemphasis that is to be performed on the plurality optical signals of the WDM signal in said first optical network in accordance with the change in the number of wavelengths, which change is monitored as said the-number-of-wavelengths information by said wavelength monitoring means, and amount-of-preemphasis controlling means for controlling an optical signal transmitter said first WDM optical network in such a manner that said first particular WDM optical network performs preemphasis of the last-named amounts, which has been computed by said amount-of-preemphasis computing means and said variation factor monitoring means of said central controller includes:

signal-quality-information collecting means for collecting, as one of said variation factors, signal quality information about a quality of WDM signal, which is transmitted in said each WDM optical network, at the time when being received by said individual optical receiver therein, threshold-value-information retaining means for retaining threshold value information of threshold values of qualities of said WDM signal transmitted in said each WDM optical networks, and signal-quality monitoring means for monitoring whether or not said signal quality information for a second WDM optical network, which is the WDM optical network one of said plural WDM optical networks, is equal to or smaller than said threshold value for said particular WDM optical network, which information is retained in said threshold-value-information retaining means; and said preemphasis controlling means of said central controller includes quality controlling means for controlling, if the result of last-named monitoring by said signal-quality monitoring means is positive, the intensities of optical signals in a WDM signal that is to be transmitted in said second WDM optical network by adjusting amounts of preemphasis that is to be performed on said second WDM optical network in such a manner that signal quality information of the last-named WDM signal transmitted in said second WDM optical network becomes greater than said last-named threshold value, and said variation factor monitoring means of said central controller further includes alarm-information receiving means for receiving, as one of said variation factors, alarm information of an alarm issued over the WDM signal transmitted in each said WDM optical network; and said signal-quality-information collecting means starts, upon receipt of said alarm by said alarm receiving means, the collecting of said signal quality information of the WDM signal transmitted in each said optical network, which issued said received alarm information.

12. A WDM (Wavelength Division Multiplexed) transmission system comprising:

a plurality of WDM optical networks, each of said WDM optical network including an optical signal receiver, and an optical signal transmitter, communicably connected to said optical signal receiver, for transmitting, to said optical signal receiver, a WDM signal having a plurality of optical signals at respective different wavelengths with adjusting each of intensities of said plural optical signals by performing preemphasis; and a central controller, communicably connected to said plural WDM optical networks via a plurality of monitor/control lines respectively, including:

variation factor monitoring means for monitoring one or more variation factors which requires a new setting for said preemphasis performed by said optical signal transmitter of each said WDM optical network via a respective one of the plural monitor/control lines; and preemphasis controlling means for controlling a status of said preemphasis by adjusting said setting for said preemphasis performed by said optical signal transmitter of each said WDM optical network via the respective monitor/control line based on the result of the monitoring carried out by said variation factor monitoring means, wherein said variation factor monitoring means of said central controller further includes:
the-number-of-wavelengths-information collecting means for collecting, as one of said variation factors, the-number-of-wavelengths information about the number of wavelengths used for optical signals of the WDM signal transmitted in said each WDM optical network, and
the-number-of-wavelengths monitoring means for monitoring whether or not there is a change in the number of wavelengths used for optical signals of the WDM signal transmitted in a first WDM optical network, which is the WDM optical network one of said plural WDM optical networks, based on said the-number-of-wavelengths information, which has been collected by said the-number-of-wavelengths collecting means:

said preemphasis controlling means of said central controller includes:
amount-of-preemphasis computing means for computing, if the result of said last-named monitoring by said the-number-of-wavelengths monitoring means is positive, amounts of preemphasis that is to be performed on the plurality optical signals of the WDM signal in said first optical network in accordance with the change in the number of wavelengths, which change is monitored as said the-number-of-wavelengths information by said wavelength monitoring means, and
amount-of-preemphasis controlling means for controlling an optical signal transmitter said first WDM optical network in such a manner that said first particular WDM optical network performs preemphasis of the last-named amounts, which has been computed by said amount-of-preemphasis computing means;

said variation factor monitoring means of said central controller includes:
signal-quality-information collecting means for collecting, as one of said variation factors, signal quality information about a quality of WDM signal, which is transmitted in said each WDM optical network, at the time when being received by said individual optical receiver therein,
threshold-value-information retaining means for retaining threshold value information of threshold values of qualities of said WDM signal transmitted in said each WDM optical networks, and
signal-quality monitoring means for monitoring whether or not said signal quality information for a second WDM optical network, which is the WDM optical network one of said plural WDM optical networks, is equal to or smaller than said threshold value for said particular WDM optical network, which information is retained in said threshold-value-information retaining means; and said preemphasis controlling means of said central controller includes quality controlling means for controlling, if the result of last-named monitoring by said signal-quality monitoring means is positive, the intensities of optical signals in a WDM signal that is to be transmitted in said second WDM optical network by adjusting amounts of preemphasis that is to be performed on said second WDM optical network in such a manner that signal quality information of the last-named WDM signal transmitted in said second WDM optical network becomes greater than said last-named threshold value;
said signal-quality-information collecting means periodically collects said signal quality information;
said variation factor monitoring means of said central controller further includes alarm-information receiving means for receiving, as one of said variation factors, alarm information of an alarm issued over the WDM signal transmitted in each said WDM optical network; and
said signal-quality-information collecting means starts, upon receipt of said alarm by said alarm receiving means, the collecting of said signal quality information of the WDM signal transmitted in each said optical network, which issued said received alarm information.

13. A WDM (Wavelength Division Multiplexed) transmission system comprising:
a plurality of WDM optical networks, each of said WDM optical network including
an optical signal receiver, and
an optical signal transmitter, communicably connected to said optical signal receiver, for transmitting, to said optical signal receiver, a WDM signal having a plurality of optical signals at respective different wavelengths with adjusting each of intensities of said plural optical signals by performing preemphasis; and
a central controller, communicably connected to said plural WDM optical networks via a plurality of monitor/control lines respectively, including:
variation factor monitoring means for monitoring one or more variation factors which requires a new setting for said preemphasis performed by said optical signal transmitter of each said WDM optical network via a respective one of the plural monitor/control lines; and
preemphasis controlling means for controlling a status of said preemphasis by adjusting said setting for said preemphasis performed by said optical signal transmitter of each said WDM optical network via the respective monitor/control line based on the result of the monitoring carried out by said variation factor monitoring means,
wherein
said variation factor monitoring means of said central controller includes:
signal-quality-information collecting means for collecting, as one of said variation factors, signal quality information about a quality of WDM signal, which is transmitted in said each WDM optical network, at the time when being received by said individual optical receiver therein,
threshold-value-information retaining means for retaining threshold value information of threshold values of qualities of said WDM signal transmitted in said each WDM optical networks, and
signal-quality monitoring means for monitoring whether or not said signal quality information for a second WDM optical network, which is the WDM optical network one of said plural WDM optical networks, is equal to or smaller than said threshold value for said particular WDM optical network, which information is retained in said threshold-value-information retaining means;
said preemphasis controlling means of said central controller includes quality controlling means for controlling, if the result of last-named monitoring by said signal-quality monitoring means is positive, the intensities of optical signals in a WDM signal that is to be transmitted in said second WDM optical network by adjusting amounts of preemphasis that is to be performed on said second WDM optical network in such a manner that signal quality information of the last-named WDM signal transmitted in said second WDM optical network becomes greater than said last-named threshold value;

said variation factor monitoring means of said central controller further includes alarm-information receiving means for receiving, as one of said variation factors, alarm information of an alarm issued over the WDM signal transmitted in each said WDM optical network; and said signal-quality-information collecting means starts, upon receipt of said alarm by said alarm receiving means, the collecting of said signal quality information of the WDM signal transmitted in each said optical network, which issued said received alarm information.

14. A WDM (Wavelength Division Multiplexed) transmission system comprising:

a plurality of WDM optical networks, each of said WDM optical network including
  an optical signal receiver, and
  an optical signal transmitter, communicably connected to said optical signal receiver, for transmitting, to said optical signal receiver, a WDM signal having a plurality of optical signals at respective different wavelengths with adjusting each of intensities of said plural optical signals by performing preemphasis; and a central controller, communicably connected to said plural WDM optical networks via a plurality of monitor/control lines respectively, including:
  variation factor monitoring means for monitoring one or more variation factors which requires a new setting for said preemphasis performed by said optical signal transmitter of each said WDM optical network via a respective one of the plural monitor/control lines; and
  preemphasis controlling means for controlling a status of said preemphasis by adjusting said setting for said preemphasis performed by said optical signal transmitter of each said WDM optical network via the respective monitor/control line based on the result of the monitoring carried out by said variation factor monitoring means, wherein
said variation factor monitoring means of said central controller includes:
  signal-quality-information collecting means for collecting, as one of said variation factors, signal quality information about a quality of WDM signal, which is transmitted in said each WDM optical network, at the time when being received by said individual optical receiver therein,
  threshold-value-information retaining means for retaining threshold value information of threshold values of qualities of said WDM signal transmitted in said each WDM optical networks, and
  signal-quality monitoring means for monitoring whether or not said signal quality information for a second WDM optical network, which is the WDM optical network one of said plural WDM optical networks, is equal to or smaller than said threshold value for said particular WDM optical network, which information is retained in said threshold-value-information retaining means;

said preemphasis controlling means of said central controller includes quality controlling means for controlling, if the result of last-named monitoring by said signal-quality monitoring means is positive, the intensities of optical signals in a WDM signal that is to be transmitted in said second WDM optical network by adjusting amounts of preemphasis that is to be performed on said second WDM optical network in such a manner that signal quality information of the last-named WDM signal transmitted in said second WDM optical network becomes greater than said last-named threshold value;

said signal-quality-information collecting means periodically collects said signal quality information;

said variation factor monitoring means of said central controller further includes alarm-information receiving means for receiving, as one of said variation factors, alarm information of an alarm issued over the WDM signal transmitted in each said WDM optical network; and said signal-quality-information collecting means starts, upon receipt of said alarm by said alarm receiving means, the collecting of said signal quality information of the WDM signal transmitted in each said optical network, which issued said received alarm information.

15. A method for controlling preemphasis in a WDM (Wavelength Division Multiplexed) transmission system comprising a plurality of WDM optical networks, each of the WDM optical networks including an optical signal receiver and an optical signal transmitter, communicably connected to the optical signal receiver, for transmitting, to the optical signal receiver, a WDM signal having a plurality of optical signals at respective different wavelengths, with adjusting each of intensities of the plural optical signals by performing preemphasis, and a central controller communicably connected to each of the plural WDM optical networks via a plurality of monitor/control lines respectively, said method comprising the steps of:

at the central controller
  (a) monitoring one or more variation factors which requires a new setting for said preemphasis performed by the optical signal transmitter of each of the WDM optical networks; and
  (b) controlling a status of said preemphasis by adjusting the setting for said preemphasis performed by the optical signal transmitter of each of the WDM optical networks via a respective one of the plural monitor/control lines based on the result of the monitoring in said variation factor monitoring step (a); and at a storing means
  storing intensity information of intensities of the optical signals at the respective different wavelengths are included in the WDM signal output from the optical signal transmitter of each of the plural WDM signal networks when an initialization for amounts of said preemphasis is performed, and time information of the time when the intialization is performed, said variation factors monitoring step (a) including the step of (a-1) monitoring whether or not a predetermined time period has passed since an initialization of a first optical signal transmitter, which is the optical signal transmitter of one of the plural WDM optical networks based on the time information stored in said storing step, said optical transmitters controlling step (b) including the step of (b-1) controlling, if the result of said monitoring by said monitoring step (a-1) is positive, intensities of optical signals in a WDM signal that is to be output from a first optical signal transmitter by adjusting amounts of said preemphasis performed by the first optical signal transmitter in such a manner that the last-named intensities of the optical signals of the first optical signal transmitter become identical with those when the initialization is performed, based on the intensity information stored in said storing step.

16. A method for controlling preemphasis according to claim 15, said variation factors monitoring steps (a) further including the step of (a-2) monitoring, as one of the variation factors, whether or not there is a change in the number of wavelengths used for optical signals in the individual WDM signal transmitted in a first particular WDM optical network, which is the WDM optical network of one of the plural WDM networks, by collecting information about the number of optical signals in the WDM signal transmitted in the first WDM optical network; and said optical transmitters controlling step (b) including the steps of:

(b-2) computing, if the result of said last-named monitoring step is positive, amounts of preemphasis that is to be performed on a plurality of optical signals of a WDM signal in the first optical network in accordance with the change in the number of optical signals, which is monitored in said last-named monitoring step (a-2), and (b-3) controlling a optical transmitter of the first WDM optical network in such a manner that the first particular network performs preemphasis of the last-named amounts, which has been computed in said amount-of-preemphasis computing step (b-2).

17. A method for controlling preemphasis according to claim 16, further comprising the step of collecting, as one of the variation factors, signal quality information about quality of the WDM signal transmitted in each of the WDM optical networks, said variation factors monitoring step (a) further including the step of (a-3) monitoring whether or not the signal quality information of a second WDM optical network, which is the WDM optical network one of the plural WDM optical networks, are equal to or smaller than threshold value previously set for the second WDM network; and said optical transmitter controlling step (b) further including the step of (b-4) controlling, if the result of monitoring in said last-named monitoring step (a-3) is positive, the intensities of optical signals in a WDM signal that is to be transmitted in the second optical transmitter in the second particular WDM network by adjusting amounts of preemphasis that is to be performed on the second WDM optical network in such a manner that said signal quality of the last-named WDM signal transmitted in the second WDM optical network becomes greater than the last-named threshold value for the second optical network.

18. A method for controlling preemphasis according to claim 15, further comprising the step of collecting, as one of the variation factors, signal quality information about quality of the WDM signal transmitted in each of the WDM optical networks, said variation factors monitoring step (a) further including the step of (a-3) monitoring whether or not the signal quality information of a second WDM optical network, which is the WDM optical network one of the plural WDM optical networks, are equal to or smaller than threshold value previously set for the second WDM network; and said optical transmitter controlling step (b) further including the step of (b-4) controlling, if the result of monitoring in said last-named monitoring step (a-3) is positive, the intensities of optical signals in a WDM signal that is to be transmitted in the second optical transmitter in the second particular WDM network by adjusting amounts of preemphasis that is to be performed on the second WDM optical network in such a manner that said signal quality of the last-named WDM signal transmitted in the second WDM optical network becomes greater than the last-named threshold value for the second optical network.

19. A method for controlling preemphasis in a WDM (Wavelength Division Multiplexed) transmission system comprising a plurality of WDM optical networks, each of the WDM optical networks including an optical signal receiver and an optical signal transmitter, communicably connected to the optical signal receiver, for transmitting, to the optical signal receiver, a WDM signal having a plurality of optical signals at respective different wavelengths, with adjusting each of intensities of the plural optical signals by performing preemphasis, and a central controller communicably connected to each of the plural WDM optical networks via a plurality of monitor/control lines respectively, said method comprising the steps of:

at the central controller (a) monitoring one or more variation factors which requires a new setting for said preemphasis performed by the optical signal transmitter of each of the WDM optical networks; and (b) controlling a status of said preemphasis by adjusting the setting for said preemphasis performed by the optical signal transmitter of each of the WDM optical networks via a respective one of the plural monitor/control lines based on the result of the monitoring in said variation factor monitoring step (a);

said variation factors monitoring step (a) including the step of (a-4) receiving, as one of said variation factors, alarm information about an alarm issued over the WDM signal transmitted in each of the plural WDM optical networks; and (a-5) collecting, upon receipt said alarm information in said alarm receiving step (a-4), said signal quality information of the last-named WDM signal.

* * * * *

UNITED STATES PATENT AND TRADEMARK OFFICE
CERTIFICATE OF CORRECTION

PATENT NO. : 6,999,680 B2
APPLICATION NO. : 10/087806
DATED : February 14, 2006
INVENTOR(S) : Shinya Yamakawa It is certified that error appears in the above-identified patent and that said Letters Patent is hereby corrected as shown below:

Column 13,
Lines 62-63, after "for controlling" delete "controlling".

Column 19,
Line 17, after "means" delete ":" and insert -- ; --.

Column 22,
Line 61, delete "intialization" and insert -- initialization --.
Line 63, delete "of(a-1)" and insert -- of (a-1) --.

Column 23,
Line 17, delete "steps (a)" and insert -- step (a) --.

Column 24,
Line 45, delete "(b)controlling" and insert -- (b) controlling --.
Line 57, delete "(a-5)collecting" and insert -- (a-5) collecting --.

Signed and Sealed this

Eleventh Day of July, 2006

JON W. DUDAS
*Director of the United States Patent and Trademark Office*